US007222285B2

(12) United States Patent
Chou et al.

(10) Patent No.: US 7,222,285 B2
(45) Date of Patent: May 22, 2007

(54) LAYERED MULTIPLE DESCRIPTION CODING

(75) Inventors: Philip Andrew Chou, Bellevue, WA (US); Venkata N. Padmanabhan, Bellevue, WA (US); Helen Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 10/802,648

(22) Filed: Mar. 17, 2004

(65) Prior Publication Data

US 2005/0210356 A1 Sep. 22, 2005

(51) Int. Cl.
*H03M 13/00* (2006.01)

(52) U.S. Cl. .................................. 714/779; 714/776
(58) Field of Classification Search ................ 714/776, 714/779
See application file for complete search history.

(56) References Cited

U.S. PATENT DOCUMENTS

| | | | | |
|---|---|---|---|---|
| 5,621,660 | A | * | 4/1997 | Chaddha et al. ............ 709/247 |
| 5,768,535 | A | * | 6/1998 | Chaddha et al. ............ 709/247 |
| 6,011,868 | A | * | 1/2000 | van den Branden et al. ..... 382/233 |

OTHER PUBLICATIONS

Albanese, et al., "Priority Encoding Transmission", *IEEE Transaction on Information Theory*, vol. 42, pp. 1737-1744 (Nov. 1996).
Chou et al., "Clustering Source/Channel Rate Allocations for Receiver-driven Multicast under a Limited Number of Streams", *2000 IEEE International Conference on Multimedia and Expo, ICME 2000*, pp. 1221-1224 (Jul. 2000).
Chou et al., "Error Control for Receiver-Driven Layered Multicast of Audio and Video", *IEEE Transactions on Multimedia*, vol. 3, No. 1, pp. 108-122 (Mar. 2001).
Davis et al., "Joint Source and Channel Coding for Image Transmission Over Lossy Packet Networks", *SPIE*, vol. 2847, pp. 376-387 (Aug. 1996).
Goyal, Vivek K., "Multiple Description Coding: Compression Meets the Network", *IEEE Signal Processing Magazine*, pp. 74-93 (Sep. 2001).
Mohr et al., "Approximately Optimal Assignment for Unequal Loss Protection", *Proceedings of the International Conference on Image Processing*, pp. 367-370 (2000).

(Continued)

*Primary Examiner*—Guy Lamarre
*Assistant Examiner*—Mujtaba K. Chaudry
(74) *Attorney, Agent, or Firm*—Wolf, Greenfield & Sacks, P.C.

(57) ABSTRACT

A data sequence may be encoded in a plurality of layers of multiple description coding. The layers of multiple description coding may include a first and a second layer of multiple description coding. The first layer of multiple description coding may include an initial part of a data sequence as well as forward error correction code for the initial part. The second layer of multiple description coding may include a next part of the data sequence as well as forward error correction code for the next part. A first set of data sequence breakpoints may be determined for the first layer of multiple description coding. A second set of data sequence breakpoints may be determined for the second layer. The data sequence may be encoded in the plurality of layers of multiple description coding as a function of the first and second sets of data sequence breakpoints.

11 Claims, 14 Drawing Sheets

OTHER PUBLICATIONS

Mohr et al., "Unequal Loss Protection: Graceful Degradation of Image Quality over Packet Erasure Channels Through Forward Error Correction", *IEEE Journal on Selected Areas in Communications: A Publication of the IEEE Communications Society*, vol. 18, No. 6, pp. 819-829 (Jun. 2000).

Padmanabhan et al., "Distributing Streaming Media Content Using Cooperative Networking", *Proceedings of the 12th International Workshop on Network and Operating Systems Support for Digital Audio and Video: NOSSDAV 2002*, pp. 177-186 (May 2002).

Puri et al., "Multiple Description Source Coding Through Forward Error Correction Codes", pp. 342-346 (Oct. 1999).

Stankovic, et al., "Packet Loss Protection of Embedded Data with Fast Local Search", *ICIP: 2002 Proceedings of International Conference on Image Processing*, pp. II-165-168 (Sep. 2002).

Zimmermann, Hubert, "OSI Reference Model—The ISO Model of Architecture for Open Systems Interconnection", *IEEE Transactions on Communications*, vol. COM-28, No. 4, pp. 425-432 (Apr. 1980).

Barabasi, Albert-Laszlo, et al., "Emergence of Scaling in Random Networks," *Science*, vol. 286, (1999), pp. 509-512.

Bu, Tian, et al., "Network Tomography on General Topologies," *Proc. ACM Sigmetrics*, (2002).

Castro, Miguel, et al., "SplitStream: High-bandwidth Content Distribution in Cooperative Environments," *Proc. SOSP*, (2003).

Chawathe, Yatin, et al., "Making Gnutella-like P2P Systems Scalable," *Proc. ACM SIGCOMM*, (2003).

Chu, Yang-Hua, et al., "Enabling Conferencing Applications on the Internet Using an Overlay Multicast Architecture," *Proc. ACM SIGCOMM*, (2001).

"End System Multicast," http://esm.cs.cmu.edu, printed on May 6, 2004.

Liu, Jiangchuan, et al., "A Hybrid Adaptation Protocol for TCP-Friendly Layered Multicast and Its Optimal Rate Allocation," *IEEE Infocom*, (2002).

McCanne, S.R., et al., "Receiver-driven Layered Multicast," *Proc. ACM SIGCOMM*, (1996).

Medina, Alberto, et al., "BRITE: An Approach to Universal Topology Generation," *Proc. MASCOTS*, (2001).

Padmanabhan, Venkat, et al., "Resilient Peer-to-Peer Streaming," *Proc. IEEE ICNP*, (2003).

http://www.rawflow.com/technology.html, printed on May 4, 2004.

Wicker, "Error Control Systems for Digital Communication and Storage," Prentice Hall, Copyright © 1995 512 pp.

Wu, Linda, et al., "Thin Streams: An Architecture for Multicasting Layered Video," *Proc. NOSSDAV*, (1997).

Chou et al., "Layered Multiple Description Coding," *Proceedings of the Packet Video Workshop*, Nantes, France, Apr. 2003.

Majumdar et al., "Rate-Distortion Efficient Video Transmission from Multiple Servers," *International Conference on Multimedia and Expo (ICME)*, Lausanne, Switzerland (Aug. 2002).

Nguyen et al., "Distributed Video Streaming with Forward Error Correction," *Packet Video Workshop*, Pittsburgh, PA (2002).

Padmanabhan et al., "Supporting Heterogeneity and Congestion Control in Peer-to-Peer Multicast Streaming," *The 3rd International Workshop on Peer-to-Peer Systems (IPTPS 2004)*, San Diego, CA, Feb. 26-27, 2004.

\* cited by examiner

LAYERED MULTIPLE DESCRIPTION CODING

FIELD OF THE INVENTION

This invention pertains generally to data encoding and, more particularly, to data encoding for heterogeneous unreliable communication connections.

BACKGROUND OF THE INVENTION

Computers are becoming destinations for an increasing number of information types. Text and graphics, audio and video, broadcast and interactive: people are using computers to communicate an increasing volume of information. In addition, there is an increasing variety of communication paths. Each technological advance and trend adds new communication paths but adoption is typically not uniform and older communication paths can remain in service, and even popular, for years.

Wired and wireless, fast and slow, planned and ad hoc: the variety of communication paths can be a challenge for communication application designers. In particular, it has become common for computers to communicate over large heterogeneous networks such as the Internet. Application designs targeted to low end communication paths may seem drab next to application designs targeted to high end communication paths but application designs targeted to high end communication paths may be of limited use to significant segments of an application's potential user population.

Communication path bandwidth may be one differentiator between high end and low end communication paths. In addition, communication paths typically have some level of unreliability, that is, data may be lost or corrupted between sender and receiver. Some conventional data encoding techniques help protect against data loss and may have other desirable characteristics but lack sufficient sensitivity with respect to, for example, bandwidth heterogeneity. Some conventional data encoding techniques enable adaptation to a spectrum of communication path bandwidths but perform poorly over unreliable communication paths or are inflexible with respect to data loss or corruption.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, a data sequence is encoded in a plurality of layers of multiple description coding. A first set of data sequence breakpoints may be determined for the first layer of multiple description coding. A second set of data sequence breakpoints may be determined for the second layer of multiple description coding. The data sequence may be encoded in the plurality of layers of multiple description coding as a function of the first and second sets of data sequence breakpoints. The data sequence may be encoded in the plurality of layers of multiple description coding by a layered multiple description encoder.

In an embodiment of the invention, a plurality of layers of multiple description coding include a first layer of multiple description coding and a second layer of multiple description coding. The first layer of multiple description coding may include an initial part of a distortion-prioritized data sequence and forward error correction code for the initial part of the distortion-prioritized data sequence. The second layer of multiple description coding may include a next part of the distortion-prioritized data sequence and forward error correction code for the next part of the distortion-prioritized data sequence. At least a portion of the distortion-prioritized data sequence may be decoded from at least one of the plurality of layers of multiple description coding.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
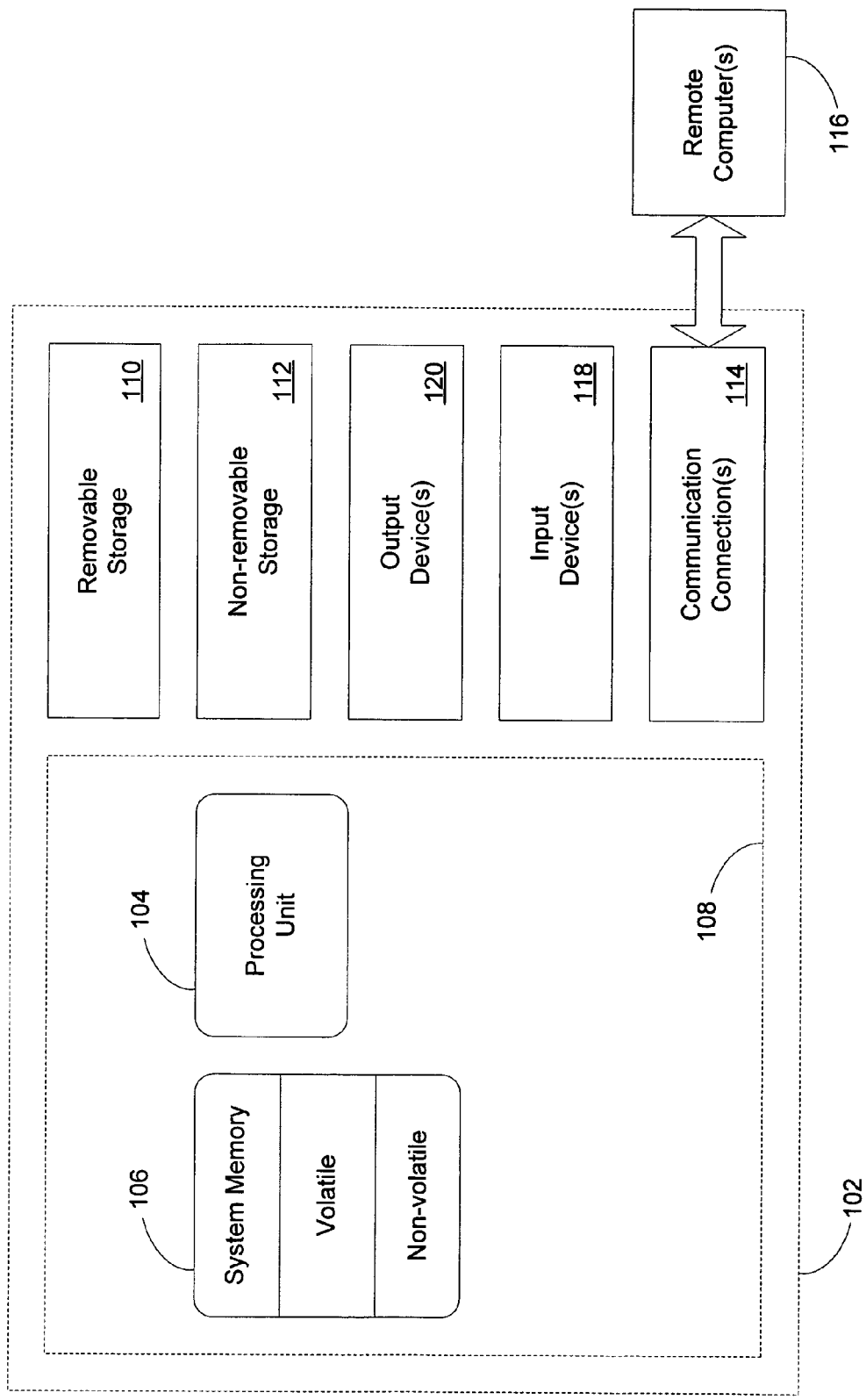
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communication connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Transmission of data over a communication network may involve several strata of data encoding with each stratum of data encoding providing a particular set of functionality. For example, the International Standards Organization (ISO) describes an open systems interconnect (OSI) model including an application stratum, a presentation stratum, a session stratum, a transport stratum, a network stratum, a data link stratum and a hardware stratum. Different hardware stratum data encodings may be suitable for different physical communications media, network stratum data encodings may provide for network addressing and routing, and so on. For details see Zimmerman, *OSI Reference Model—The ISO Model of Architecture for Open System Interconnection*, IEEE Transactions on Communications, April 1980.

In an embodiment of the invention, at least one such stratum of data encoding incorporates layered multiple description coding (LMDC). Layered multiple description coding may include facilities to enable graceful adaptation to unreliable communication paths as well as adaptation to communication path heterogeneity, for example, bandwidth heterogeneity, particularly in computer networks (e.g., peer-to-peer and wireless networks) where communication path characteristics may vary dynamically. As a result, layered multiple description coding may be particularly suited for multicast of data such as audio and video, however, any suitable data may be encoded with layered multiple description coding.

Figure 2:
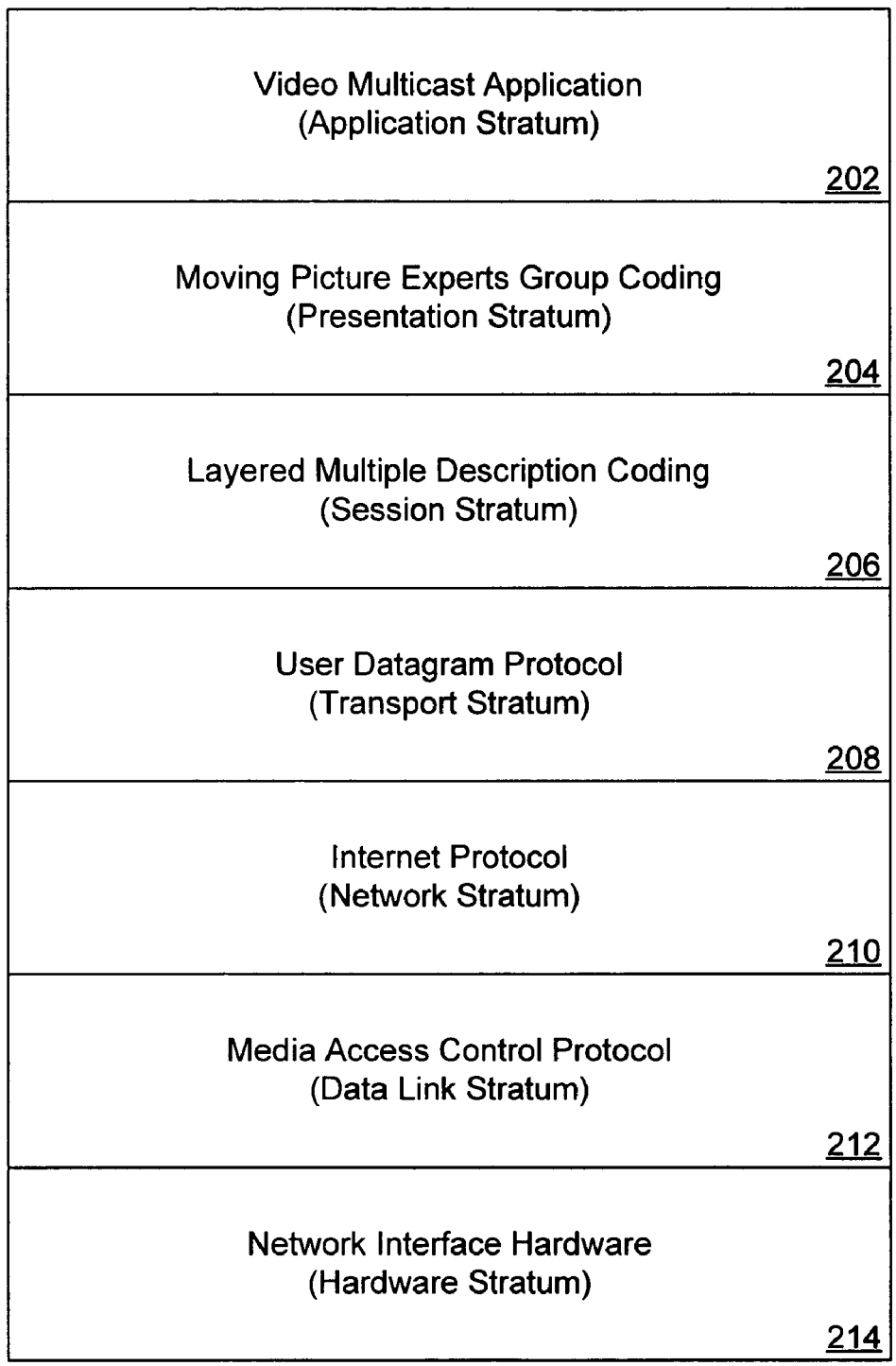
FIG. 2 is a protocol layer diagram illustrating an example incorporation of layered multiple description coding into an architecture based on an open systems interconnect model in accordance with an embodiment of the invention.

FIG. 2 illustrates an example incorporation of layered multiple description coding into an architecture 200 based on the open systems interconnect model. A video multicast application 202 may participate in the application stratum of data encoding. The video multicast application 202 may encode video into, and decode video from, a Moving Picture Experts Group (MPEG) coding 204. The video multicast application 202 may reside at one or more computers, such as the computer 102 (FIG. 1), that perform the various encodings and decodings. The MPEG coding 204 may reside in the presentation stratum of data encoding. The MPEG coding 204 may be further encoded into, and decoded from, a layered multiple description coding 206. The layered multiple description coding 206 may reside in the session stratum of data encoding.

The layered multiple description coding 206 may be further encoded into, and decoded from, a user datagram protocol (UDP) 208. The user datagram protocol 208 may reside in the transport stratum of data encoding. The user data protocol 208 may be further encoded into, and decoded from, an internet protocol (IP) 210. The internet protocol 210 may reside in the network stratum of data encoding. The internet protocol 210 may be further encoded into, and decoded from, a media access control (MAC) protocol 212 (i.e., a communication media access control protocol). The media access control protocol 212 may reside in the data link stratum of data encoding. The media access control protocol 212 may be further encoded or decoded by network interface hardware 214 (e.g., network interface hardware of the computer 102 of FIG. 1). Network interface hardware 214 may participate in the hardware stratum of data encoding.

Video multicast applications, MPEG coding, UDP, IP, MAC protocols and network interface hardware are known in the art, so only some of their details are described here. Implementations in accordance with the architecture 200 may implement multiple strata of data encoding in a single system module, for example, it is common for UDP and IP to be implemented as part of a single communication protocol stack. Layered multiple description coding 206 may be likewise incorporated into the communication protocol stack or, for example, in a video server and/or a video player that is part of the video multicast application 202. Layered multiple description coding 206 may be incorporated into communication connection(s) 114 (FIG. 1).

A computer network may include diverse communication paths between computers in the computer network. For example, different communication paths may have different communication bandwidths and different data loss characteristics. Layered multiple description coded data (i.e., data encoded with an encoding that incorporates LMDC) may include multiple interrelated layers of multiple description coding. Each destination computer may be sent one or more of the layers of the layered multiple description coded data over an associated communication path. For example, the number of layers of the layered multiple description coded data sent to a particular destination computer may be related to a bandwidth (e.g., nominal or measured) of the associated communication path.

Figure 3:
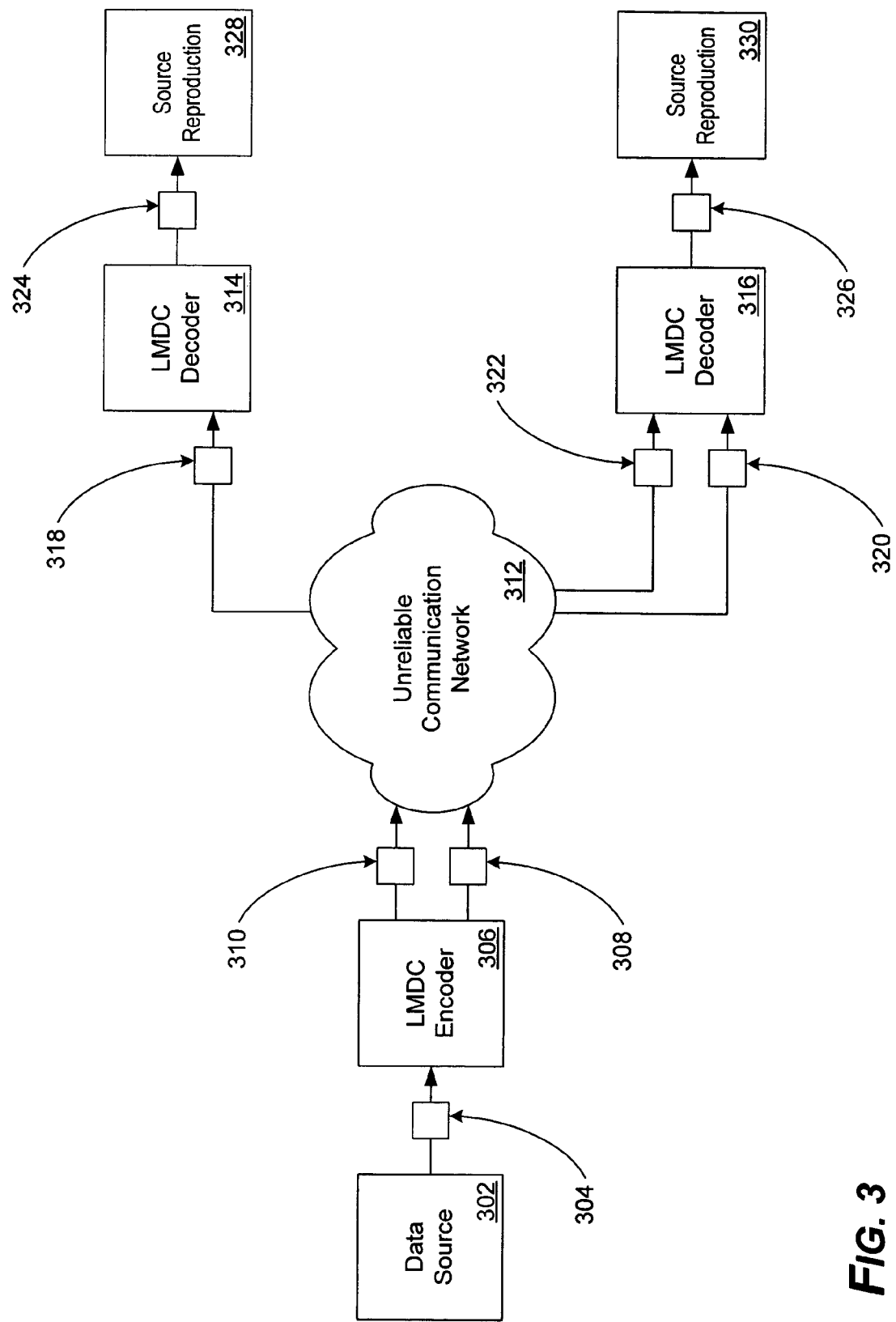
FIG. 3 is a schematic diagram illustrating aspects of an example computer network in which layered multiple description coded data is being transmitted in accordance with an embodiment of the invention.

FIG. 3 illustrates aspects of an example computer network in which layered multiple description coded data is being transmitted. A data source 302 may provide source data 304 to a layered multiple description encoder (LMDC encoder) 306. For example, the data source 302 may be video and the source data 304 may be an MPEG coding of the video. The layered multiple description encoder 306 may encode the source data 304 into multiple interrelated layers of multiple description coding. For clarity, FIG. 3 shows only a first (or base) layer of multiple description coding 308 and a second (or enhancement) layer of multiple description coding 310. Each layer of multiple description coding 308, 310 need not be a same size (e.g., contain a same amount of data).

An unreliable communication network 312 may provide communication paths between the layered multiple description encoder 306 and layered multiple description decoders (LMDC decoders) 314 and 316. The first layer of multiple description coding 308 may be sent to each layered multiple description decoder 314 and 316. The second layer of multiple description coding 310 may be sent to the layered multiple description decoder 316 but not to the layered multiple description decoder 314. For example, the communication path between the layered multiple description encoder 306 and the layered multiple description decoder 314 may have a lower bandwidth than the communication path between the layered multiple description encoder 306 and the layered multiple description decoder 316.

As a result of the communication network 312 being unreliable, the base layer of multiple description coding 318 received at the layered multiple description decoder 314 may not be identical to the base layer of multiple description coding 308 sent from the layered multiple description encoder 306. For example, the base layer of multiple description coding 318 may have errors and/or erasures when compared to the base layer of multiple description coding 308. Similarly, the base layer of multiple description coding 320 and the enhancement layer of multiple description coding 322 received at the layered multiple description decoder 316 may not be identical to the base layer of multiple description coding 308 and the enhancement layer of multiple description coding 310 sent from the layered multiple description encoder 306.

Each layered multiple description decoder 314, 316 may attempt to recover the source data 304 from the data 318, 320, 322 it receives. Recovered source data 324 and 326 may differ from the source data 304. For example, the recovered source data 324 and 326 may be some portion of the source data 304 and/or have errors with respect to the source data 304. Source data recovered by different layered multiple description decoders 314, 316 may differ. As a result of the additional layer of multiple description coding 322 received by the layered multiple description decoder 316, the recovered source data 326 may, for example, be a larger portion of the source data 304 than the recovered source data 324 and/or have less errors with respect to the source data 304.

The recovered source data 324 may be utilized to create a reproduction of the data source 302, that is, a source reproduction 328. Similarly, the recovered source data 326 may be utilized to create another source reproduction 330. For example, the source reproductions 328 and 330 may each be reproductions of video with varying degrees of fidelity or distortion compared to the data source 302. As a result of the additional layer of multiple description coding 322 received by the layered multiple description decoder 316, the source reproduction 330 may have a lower reproduction distortion or a greater reproduction fidelity than the source reproduction 328.

Each of the data source 302, the layered multiple description encoder 306, the layered multiple description decoders 314 and 316, and the source reproductions 328 and 330 illustrated in FIG. 3 may reside on a separate computer. Typically at least the layered multiple description encoder 306 and the layered multiple description decoders 314 and 316 each reside on separate computers. However, the layered multiple description decoders 314 and 316 may reside on a same computer particularly, for example, if separate communication paths over the network 312 still existed. The unreliable communication network 312 may include many well-known components, such as routers, gateways, hubs, etc. and may allow computers to communicate via wired and/or wireless media. When interacting with one another over the network 312, each computer may act as a client, server or peer with respect each other computer. Accordingly, the various embodiments of the invention may be practiced on clients, servers, peers or combinations thereof, even though specific examples contained herein may not refer to all of these types of computers.

Figure 4:
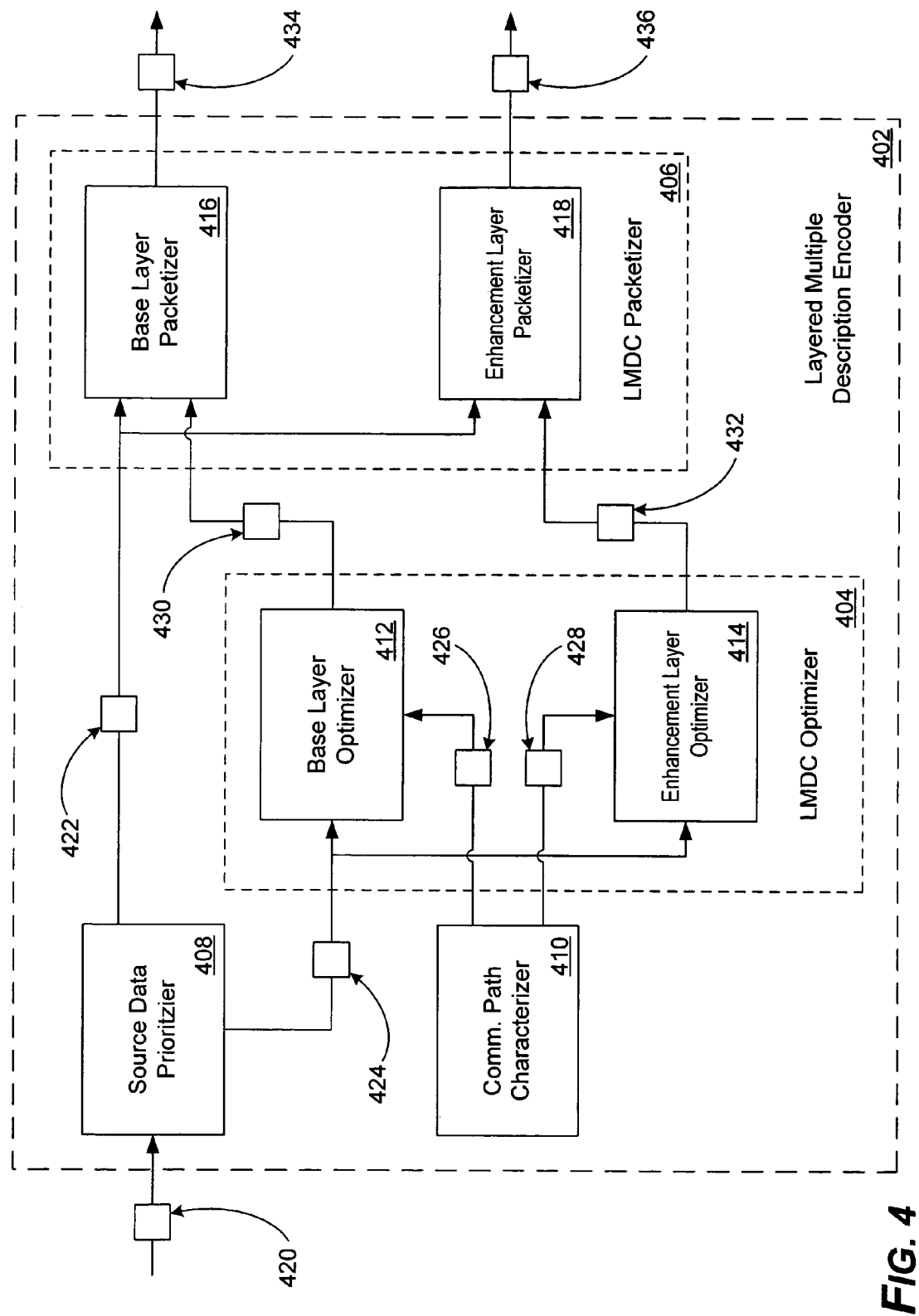
FIG. 4 is a schematic diagram illustrating an example layered multiple description encoder in accordance with an embodiment of the invention.

FIG. 4 illustrates, in more detail, an example layered multiple description encoder suitable for use as the layered multiple description encoder 306 of FIG. 3. The example layered multiple description encoder 402 includes a layered multiple description coding (LMDC) optimizer 404, a layered multiple description coding (LMDC) packetizer 406, a source data prioritizer 408 and a communication path characterizer 410. In this example, the layered multiple description coding optimizer 404 includes a first LMDC layer (base layer) optimizer 412 and a second LMDC layer (enhancement layer) optimizer 414. The layered multiple description coding packetizer 406 may include a first LMDC layer (base layer) packetizer 416 and a second LMDC layer (enhancement layer) packetizer 418.

The source data prioritizer 408 may receive source data 420 corresponding to the source data 304 of FIG. 3. The source data 420 may include a plurality of data subsequences (source layers). Each source data 420 subsequence may contribute to reduction of source reproduction distortion or, equivalently, to an increase of source reproduction fidelity. Suitable fidelity measures may be understood as inversely related to corresponding distortion measures. As a result, maximization of fidelity measures may be equivalent to minimization of corresponding distortion measures. Where distortion measures are referenced in the present application, equivalent statements about corresponding fidelity measures are implied and vice versa.

Each source data 420 subsequence may contribute a different amount of distortion reduction (or, equivalently, fidelity enhancement). The source data prioritizer 408 may determine an expected distortion reduction measure for each source data 420 subsequence and prioritize (e.g., sort) the source data 420 so that subsequences that most reduce expected reproduction distortion occur earlier in a resultant distortion-prioritized data sequence 422. The prioritization of the distortion-prioritized data sequence 422 need not be strict, for example, some of the subsequences of the distortion-prioritized data sequence 422 may be out of order with respect to the expected distortion reduction measure. As described above, distortion-prioritized data sequences may also be understood as fidelity-prioritized data sequences.

The source data prioritizer 408 may provide the distortion-prioritized data sequence 422 to the layered multiple description coding packetizer 406 for packetizing. The source data prioritizer 408 may further determine a distortion-rate characteristic ("D-R curve") 424 of the distortion-prioritized data sequence 422. The distortion-rate characteristic 424 may characterize an expected source reproduction distortion of a portion of the distortion-prioritized data sequence 422 as a function of a size of the portion (i.e., an information or bit rate). The distortion-rate characteristic 424 of the distortion-prioritized data sequence 422 is described in more detail below with reference to FIG. 5. The source data prioritizer 408 may provide the distortion-rate characteristic 424 as input to the layered multiple description coding optimizer 404.

The communication path characterizer 410 may determine one or more characteristics for communication paths, for example, communication paths between the layered multiple description encoder 402 and layered multiple description decoders such as the layered multiple description decoders 314 and 316 of FIG. 3. The communication path characterizer 410 may group candidate decoders and/or communication paths to candidate decoders into sets and determine one or more characteristics for each set. For example, the communication path characterizer 410 may determine a bandwidth and a data loss characteristic for each set of communication paths. The communication path characterizer 410 may provide the layered multiple description coding optimizer 404 with a set of characteristics for each set of candidate decoders and/or communication paths. For example, the communication path characterizer 410 may provide a first set of communication path characteristics 426 corresponding to a first (or base) set of candidate decoders with a relatively low communication path bandwidth (e.g., a lower average communication path bandwidth) and a second set of communication path characteristics 428 corresponding to a second (or enhancement) set of candidate decoders with a higher communication path bandwidth (e.g., a higher average communication path bandwidth).

The layered multiple description coding optimizer 404 may determine a set of data sequence breakpoints, for example, distortion-prioritized data sequence 422 breakpoints, for each layer of multiple description coding. For example, the layered multiple description coding optimizer 404 may determine a first (or base) set of data sequence breakpoints 430 for a base layer of multiple description coding and a second (or enhancement) set of data sequence breakpoints 432 for an enhancement layer of multiple description coding. In the layered multiple description coding optimizer 404, the base layer optimizer 412 may determine the base set of breakpoints 430 as a function of the distortion-rate characteristic 424 of the distortion-prioritized data sequence 422 and the first set of communication path characteristics 426 corresponding to the base set of candidate decoders. Furthermore, the enhancement layer optimizer 414 may determine the enhancement set of breakpoints 432 as a function of the distortion-rate characteristic 424 of the distortion-prioritized data sequence 422 and the second set of communication path characteristics 428 corresponding to the enhancement set of candidate decoders. Layered multiple description coding optimization is described in more detail below.

The layered multiple description coding packetizer 406 may packetize the distortion-prioritized data sequence 422 into multiple layers of multiple description coding. The layered multiple description coding packetizer 406 may packetize (e.g., generate the data packets of) the multiple layers of multiple description coding as a function of the sets of data sequence breakpoints provided by the layered multiple description coding optimizer 404. In the layered multiple description coding packetizer 406, the base layer packetizer 416 may generate a first (or base) layer of multiple description coding 434 by packetizing the distortion-prioritized data sequence 422 as a function of the base set of data sequence breakpoints 430. Furthermore, the enhancement layer packetizer 418 may generate a second (or enhancement) layer of multiple description coding 436 by packetizing the distortion-prioritized data sequence 422 as a function of the enhancement set of data sequence breakpoints 432.

Layered multiple description coding packetization is described in more detail below.

Figure 5:
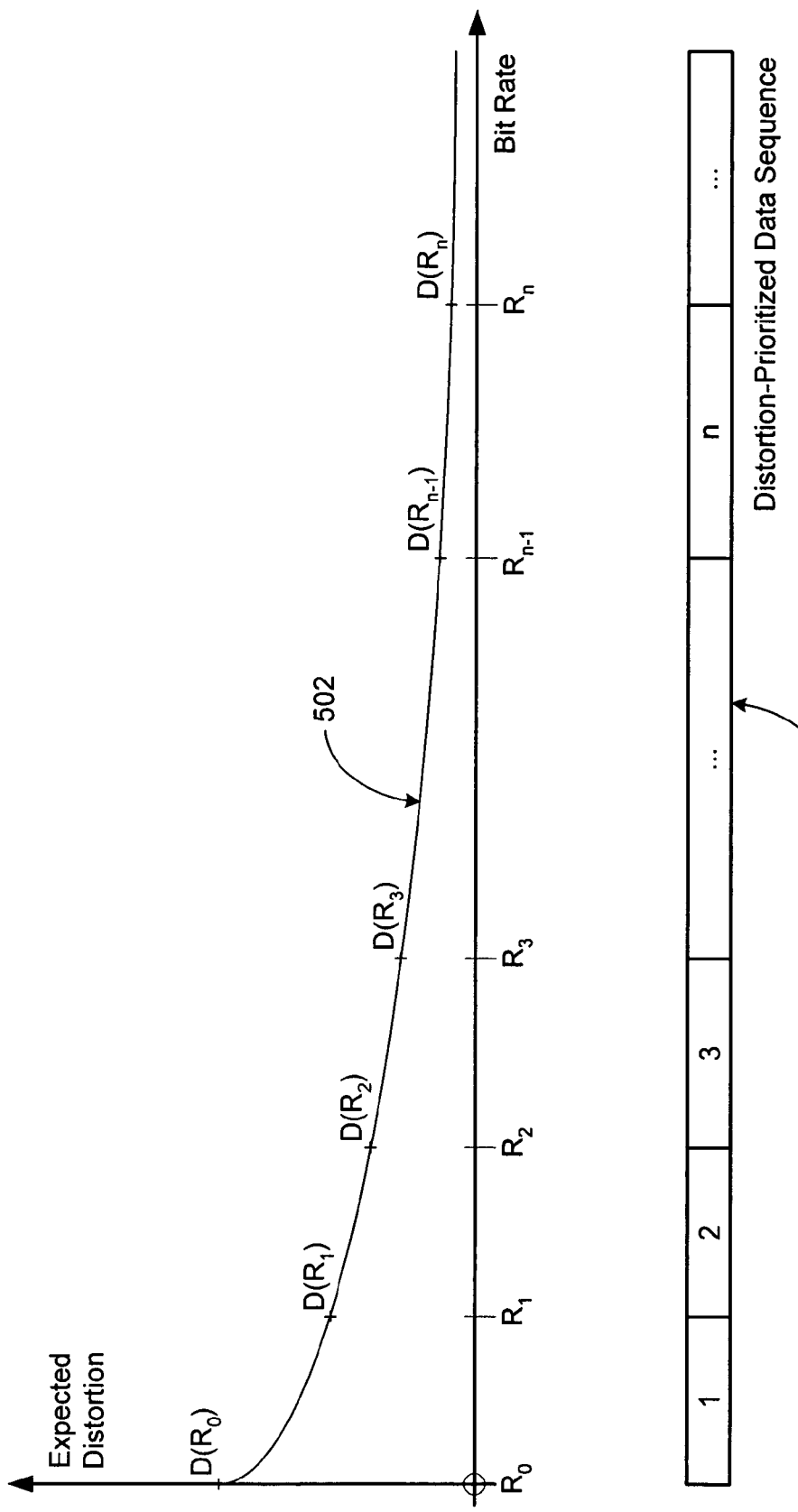
FIG. 5 is a graph showing an example distortion-rate characteristic for an example distortion-prioritized data sequence in accordance with an embodiment of the invention.

A more detailed description of some of the data structures mentioned above will be helpful. FIG. 5 depicts an example distortion-rate characteristic 502 for an example distortion-prioritized data sequence 504. The distortion-prioritized data sequence 504 is an example of the distortion-prioritized data sequence 422 (FIG. 4) that may be generated by the source data prioritizer 408. The distortion-prioritized data sequence 504 includes several data subsequences labeled '1' through 'n'. Each data subsequence of the distortion-prioritized prioritized data sequence 504 may include zero or more data points (e.g., digital bits).

Each data subsequence of the distortion-prioritized data sequence 504 may contribute to reduction of source reproduction distortion. The distortion-rate characteristic 502 characterizes the expected source reproduction distortion of portions of the distortion-prioritized data sequence 504. Different portions of the distortion-prioritized data sequence 504 may correspond to more or less digital bits of the distortion-prioritized data sequence 504. Furthermore, different portions of the distortion-prioritized data sequence 504 may correspond to more or less bits per unit time and thus to different bit rates as depicted in FIG. 5.

A first data subsequence of the distortion-prioritized data sequence 504 may correspond to a first bit rate $R_1$. Together, the first and second data subsequences of the distortion-prioritized data sequence 504 may correspond to a second bit rate $R_2$. The first, second and third data subsequences of the distortion-prioritized data sequence 504 may together correspond to a third bit rate $R_3$ and so on, so that an initial 'n' data subsequences of the distortion-prioritized data sequence 504 may together correspond to a bit rate $R_n$. Sets of data sequence breakpoints, for example, the base set of data sequence breakpoints 430 (FIG. 4) and the enhancement set of data sequence breakpoints 432, may be specified as a sequence or vector of bit rates.

A bit rate of zero (i.e., $R_0$) may correspond to a maximum expected source reproduction distortion $D(R_0)$. The first bit rate $R_1$ may correspond to a lower expected distortion $D(R_1)$. The second bit rate $R_2$ may correspond to a still lower expected distortion $D(R_2)$ and so on, so that the bit rate $R_n$ may correspond to an expected distortion $D(R_n)$ lower than an expected distortion $D(R_{n-1})$ corresponding to a bit rate $R_{n-1}$. Distortion-rate characteristics need not have a same shape as the distortion-rate characteristic 502.

The distortion-prioritized data sequence 504 may be encoded into multiple data packets such that each data packet is part of a description of a multiple description coding. Relevant context as well as details with respect to conventional multiple description coding may be found in Goyal, *Multiple Description Coding: Compression Meets the Network*, IEEE Signal Processing Magazine, pages 74-93, September 2001. Only some of the details of conventional multiple description coding are highlighted in the present description. In particular, the present description utilizes Priority Encoding Transmission (PET) as an example of a suitable multiple description coding, however, this example is not meant to be limiting. Any suitable multiple description coding may be incorporated into an embodiment of the invention. Additional relevant context as well as details with respect to Priority Encoding Transmission may be found in Albanese et al., *Priority Encoding Transmission*, IEEE Transactions on Information Theory, 42:1737-1744, November 1996. Only some of the details of Priority Encoding Transmission are highlighted in the present description.

Figure 6:
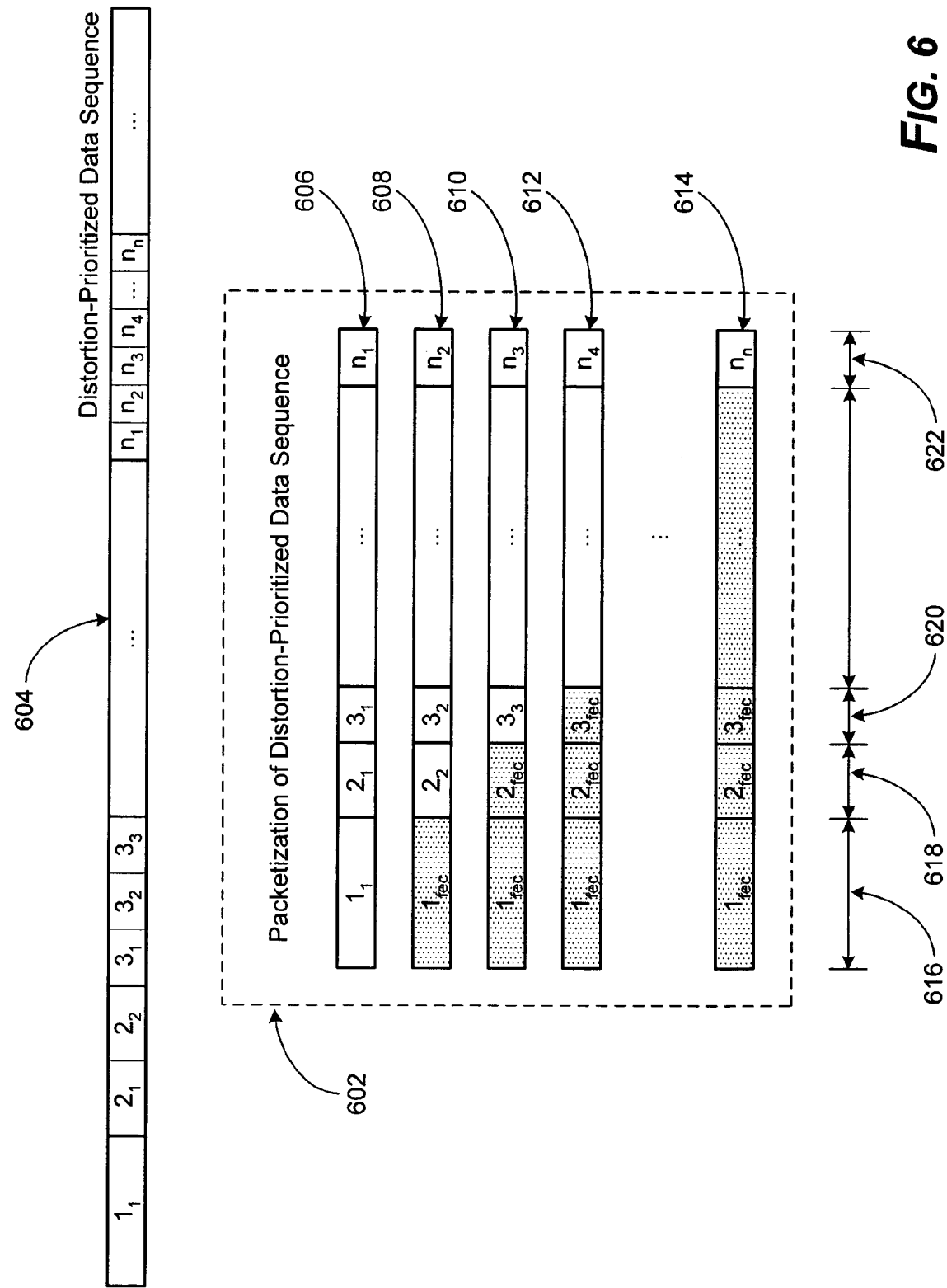
FIG. 6 is a data structure diagram illustrating an example packetization of a distortion-prioritized data sequence in accordance with an embodiment of the invention.

FIG. 6 illustrates an example packetization 602 of a distortion-prioritized data sequence 604 in accordance with a Priority Encoding Transmission multiple description coding. The subsequences of the distortion-prioritized data sequence 504 (FIG. 5) may be further subdivided as shown in distortion-prioritized data sequence 604. Each subsequence may be subdivided in proportion to its order in the distortion-prioritized data sequence 604. For example, the first subsequence may remain undivided. The second subsequence may be divided in two (i.e., into parts $2_1$ and $2_2$). The third subsequence may be divided in three (i.e., into parts $3_1$, $3_2$ and $3_3$) and so on, so that the 'n'th subsequence may be divided into 'n' parts: $n_1, n_2, n_3, n_4, \ldots, n_n$.

The distortion-prioritized data sequence 604 may be packetized into 'n' packets as illustrated by a first data packet 606, a second data packet 608, a third data packet 610, a fourth data packet 612 and an 'n'th data packet 614. Each data packet 606, 608, 610, 612 and 614 may be part of a description of the multiple description coding. The first data packet 606 may be part of a first description of the multiple description coding. The second data packet 608 may be part of a second description of the multiple description coding. The third data packet 610 may be part of a third description of the multiple description coding and so on, so that the 'n'th data packet 614 may be part of an 'n'th description of the multiple description coding.

In the packetization 602, each subsequence of the distortion-prioritized data sequence 604 may be protected by forward error correction (FEC) code. Forward error correction code may enable correction of errors in received subsequence data and even recovery of lost subsequence data, for example, if some of the data packets of the packetization 602 are not received by a particular decoder. A probability of successful error correction and/or recovery of lost data may be related to an amount of forward error correction code, that is, more received forward error correction code may make successful correction/recovery more likely.

Different subsequences may be protected by different amounts of forward error correction code (i.e., may have unequal erasure protection), for example, subsequences that most reduce expected source reproduction distortion may be protected by more forward error correction code. In the packetization 602, the first subsequence of the distortion-prioritized data sequence 604 may be protected by the most forward error correction code, i.e., 'n–1' blocks of forward error correction code labeled '$1_{fec}$'. The two divisions of the second subsequence (i.e., $2_1$ and $2_2$) may be allocated to the two data packets 606 and 608. The remaining 'n–2' data packets may contain forward error correction code for the second subsequence (labeled '$2_{fec}$'). The three divisions of the third subsequence (i.e., $3_1$, $3_2$ and $3_3$) may be allocated to the three data packets 606, 608 and 610. The remaining 'n–3' data packets may contain forward error correction code for the third subsequence (labeled '$3_{fec}$') and so on. Some subsequences may not be protected by forward error correction code, for example, the 'n' divisions of the 'n'th subsequence of the distortion-prioritized data sequence 604 may be allocated one-for-one to the 'n' data packets of the packetization 602.

The forward error correction code of the packetization 602 may be a Reed-Solomon code or any suitable maximum distance separable code. For example, a first inter-packet channel 616 containing the first subsequence of the distortion-prioritized data sequence 604 and associated forward error correction code ('$1_{fec}$') may correspond to an (n, 1) Reed-Solomon code. A second inter-packet channel 618 containing the second subsequence of the distortion-prioritized data sequence 604 and associated forward error correction code ('$2_{fec}$') may correspond to an (n, 2) Reed-Solomon code. A third inter-packet channel 620 containing the third subsequence of the distortion-prioritized data sequence 604 and associated forward error correction code ('$3_{fec}$') may correspond to an (n, 3) Reed-Solomon code and so on. An 'n'th inter-packet channel 622 containing the 'n'th subsequence,of the distortion-prioritized data sequence 604 may correspond to an (n, n) Reed-Solomon code. Reed-Solomon codes, and maximum distance separable codes in general, are known in the art and need not be described in detail here.

The packetization 602 may be optimized for a given communication path. In particular, the data sequence 604 breakpoints may be optimized so as to minimize expected source reproduction distortion for the communication path. Relevant context as well as details with respect to optimization of conventional multiple description coding packetization may be found in: Davis et al., *Joint Source and Channel Coding for Image Transmission Over Lossy Packet Networks*, Proceedings SPIE Conference on Wavelet Applications to Digital Image Processing, August 1996; Mohr et al., *Unequal Loss Protection: Graceful Degradation of Image Quality Over Packet Erasure Channels Through Forward Error Correction*, IEEE Journal on Selected Areas in Communications, 18(6):819-829, June 2000; Puri et al., *Multiple Description Source Coding Through Forward Error Correction Codes*, Proceedings IEEE Asilomar Conference on Signals, Systems, and Computers, October 1999; Mohr et al., *Approximately Optimal Assignment for Unequal Loss Protection*, Proceedings IEEE International Conference on Image Processing, September 2000; and Stanković et al., *Packet Loss Protection of Embedded Data with Fast Local Search*, Proceedings IEEE International Conference on Image Processing, September 2002. Only some of the details of optimization of conventional multiple description coding packetization are highlighted in the present description.

Briefly, optimizing the packetization 602 may involve minimizing an expected distortion measure subject to communication path bandwidth constraints. For example, a suitable expected distortion measure D(R) may be:

$$D(\mathbb{R}) = \sum_{n=0}^{N} p_n D(R_n)$$

where N is a number of data packets in the packetization 602, $p_n$ is a probability that n of the N data packets are received at an endpoint of the communication path, $R_n$ is the 'n'th data sequence 604 breakpoint and $D(R_n)$ is the expected source reproduction distortion at the specified breakpoint as described above with reference to FIG. 5, and R is a vector of the data sequence 604 breakpoints ($R_0$, $R_1$, . . . , $R_N$) that may be selected so as to minimize D(R). A set of probabilities of receiving n of N data packets {$p_0$, $p_1$, . . . , $p_n$} is an example of a data loss characteristic of the communication path suitable for incorporation into the sets of communication path characteristics 426 and 428 (FIG. 4).

As described above, layered multiple description coded data may include multiple interrelated layers of multiple description coding. Each set of candidate decoders may be sent one or more of the layers of multiple description coding. Each sequence of layers of multiple description coding may include at least one common or base layer of multiple description coding. Each layer of multiple description coding may be associated with a multiple description coding packetization such as the packetization 602. The one or more packetizations associated with each sequence of layers of multiple description coding may be optimized for a particular set of communication paths. In each sequence of layers of multiple description coding, an optimization of each packetization associated with layers of multiple description coding beyond the first may depend upon one or more optimizations of packetizations associated with layers of multiple description coding earlier in the sequence.

Figure 7:
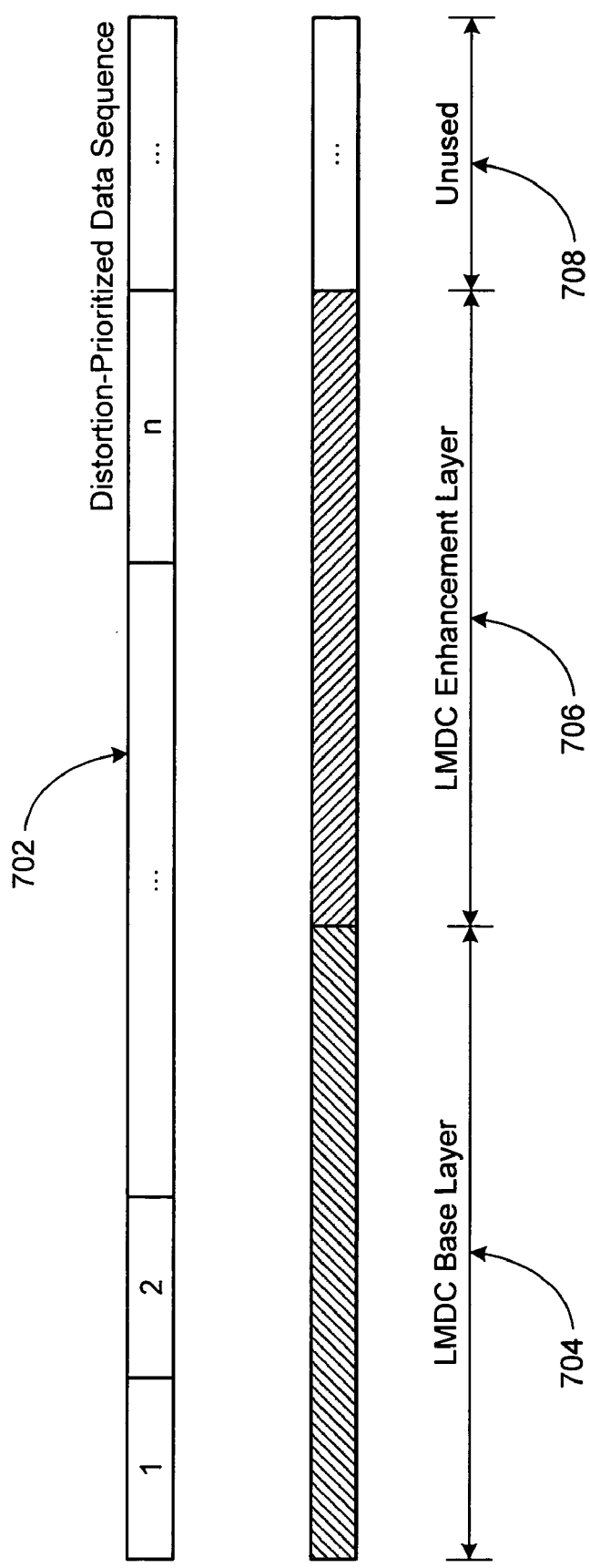
FIG. 7 is a data structure diagram illustrating an example way of allocating a distortion-prioritized data sequence to multiple layers of multiple description coding in accordance with an embodiment of the invention.

FIG. 7 illustrates a first way of allocating a distortion-prioritized data sequence 702 to multiple layers of multiple description coding in accordance with an embodiment of the invention. The distortion-prioritized data sequence 702 may correspond to the distortion-prioritized data sequence 504 of FIG. 5. An initial part 704 of the distortion-prioritized data sequence 702 may be allocated to the base layer of multiple description coding (i.e., the LMDC base layer). A next (e.g., consecutive) part 706 of the distortion-prioritized data sequence 702 may be allocated to the enhancement layer of multiple description coding (i.e., the LMDC enhancement layer). A remaining part 708 of the distortion-prioritized data sequence 702 may not be allocated to one of the multiple layers of multiple description coding, that is, may remain unused, for example, unused by the layered multiple description coding packetizer 406 (FIG. 4).

The initial part 704 and the next part 706 may each include one or more subsequences of the distortion-prioritized data sequence 702. The boundary between the initial part 704 and the next part 706 may correspond to a subsequence boundary. Again, for clarity, FIG. 7 shows allocation to only two layers of multiple description coding, however, the distortion-prioritized data sequence 702 may be allocated to a plurality of base layers of multiple description coding and/or a plurality of enhancement layers of multiple description coding.

Figure 8:
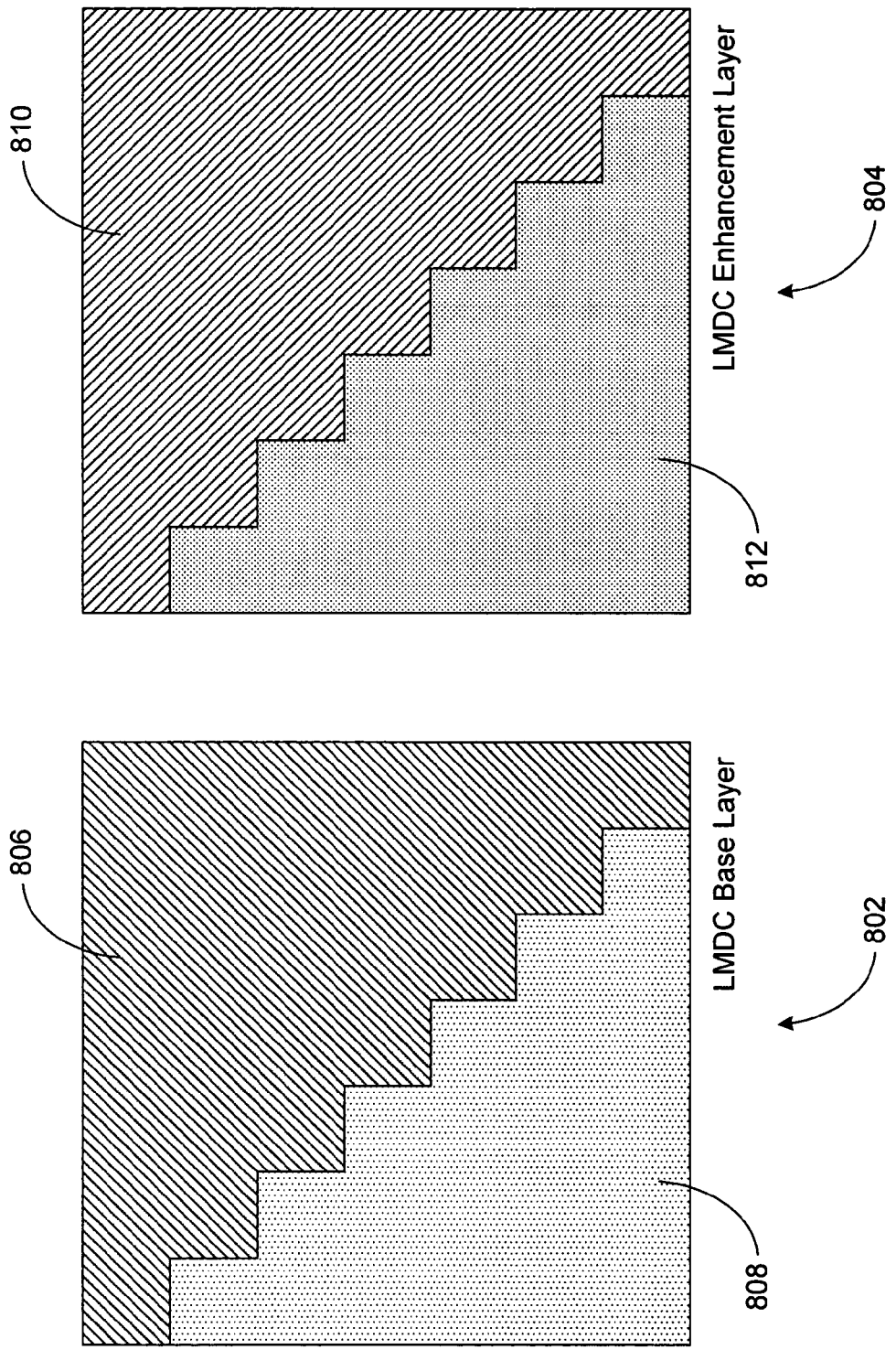
FIG. 8 is a data structure diagram illustrating example multiple description coding packetizations associated with base and enhancement layers of multiple description coding in accordance with an embodiment of the invention.

Each part 704, 706 of the distortion-prioritized data sequence 702 allocated to a particular layer of multiple description coding may be encoded in the multiple description coding packetization associated with the layer of multiple description coding. FIG. 8 schematically illustrates relatively simple multiple description coding packetizations associated with base and enhancement layers of multiple description coding. In this example, a base layer packetization 802 is associated with the base layer of multiple description coding and an enhancement layer packetization 804 is associated with the enhancement layer of multiple description coding.

Each packetization 802, 804 corresponds schematically to the packetization 602 of FIG. 6. A source data area 806 of the base layer packetization 802 corresponds to encoded source data in the packetization 602 (i.e., source data from the distortion-prioritized data sequence 604). A forward error correction code area 808 of the base layer packetization 802 corresponds to forward error correction codes in the packetization 602. Likewise, a source code data area 810 of the enhancement layer packetization 804 corresponds to the encoded source data in the packetization 602 and a forward error correction code area 812 of the enhancement layer packetization corresponds to forward error correction codes in the packetization 602. Similar schematic correspondence holds for like figures described below.

The source data area 806 of the base layer packetization 802 may contain encoded subsequences of the initial part 704 (FIG. 7) of the distortion-prioritized data sequence 702. The forward error correction code area 808 of the base layer packetization 802 may contain forward error correction codes protecting the subsequences encoded in the source data area 806. The source data area 810 of the enhancement layer packetization 804 may contain encoded subsequences of the next part 706 of the distortion-prioritized data sequence 702. The forward error correction code area 812 of the enhancement layer packetization 804 may contain forward error correction codes protecting the subsequences encoded in the source data area 810. The source data areas 806, 810 and the forward error correction code areas 808, 812 need not contain amounts of data proportional to the areas illustrated in FIG. 8 and may even be empty in limiting cases.

Referring back to FIG. 3, the base layer packetization 802 is suitable for incorporation into the base layer of multiple description coding 308 and the enhancement layer packetization 804 is suitable for incorporation into the enhancement layer of multiple description coding 310. The packetizations 802 and 804 may be optimized for the communication path between the encoder 306 and the decoder 316 (e.g., a relatively high bandwidth communication path). For example, the data sequence 702 (FIG. 7) breakpoints may be selected to minimize the expected distortion of the source reproduction 330 subject to bandwidth constraints of the communication path between the encoder 306 and the decoder 316 and the initial part 704 of the data sequence 702 allocated to the base layer packetization 802 may be determined as a number of subsequences delimited by the selected breakpoints that satisfy bandwidth constraints of the communication path between the encoder 306 and the decoder 314 (e.g., a relatively low bandwidth communication path).

Figure 9:
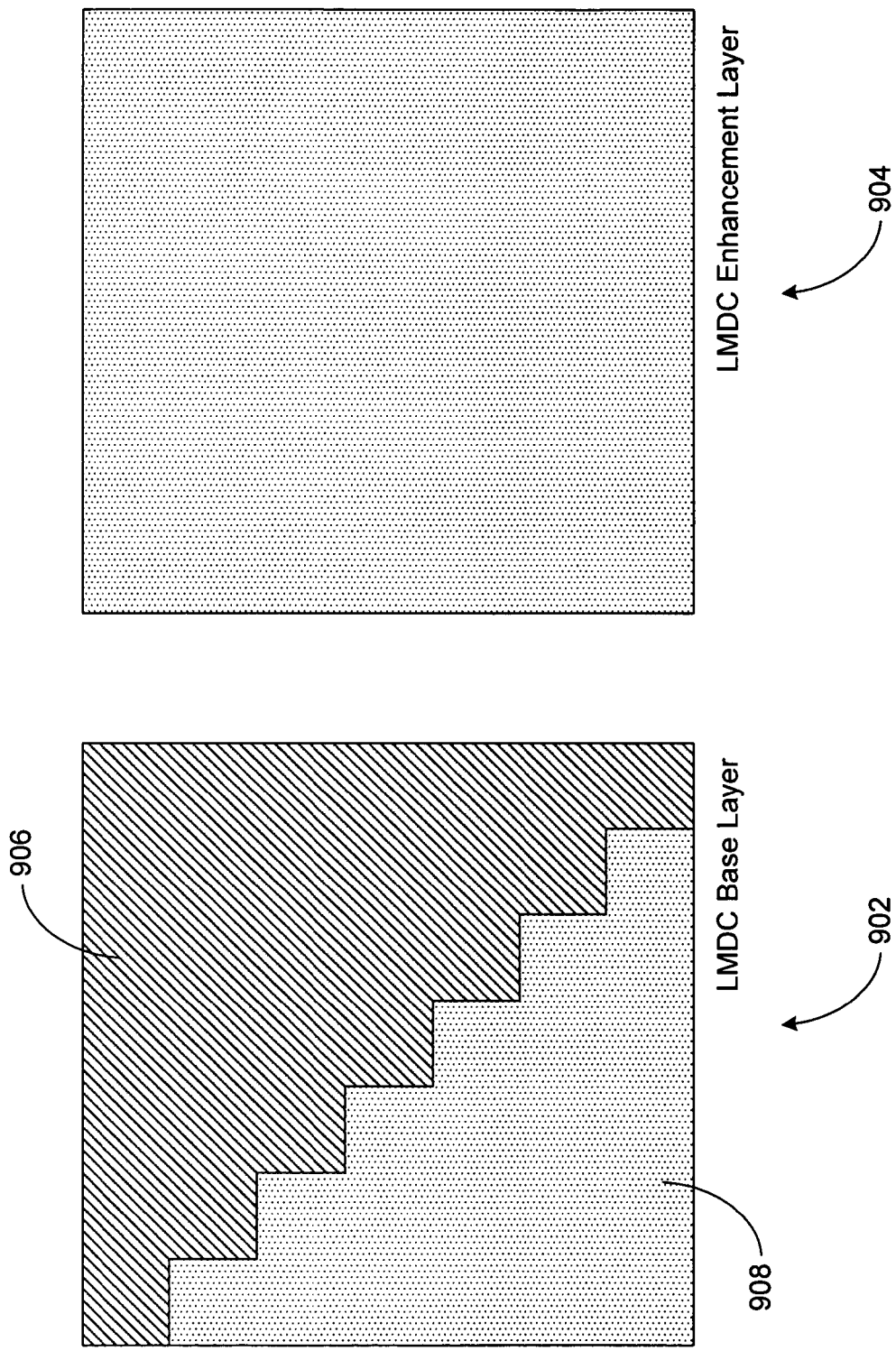
FIG. 9 is a data structure diagram illustrating further example multiple description coding packetizations associated with base and enhancement layers of multiple description coding in accordance with an embodiment of the invention.

Although this optimizing for the communication path between the encoder 306 (FIG. 3) and the decoder 316 may minimize distortion at the source reproduction 330, distortion at the source reproduction 328 may be high. Alternatively, the base and enhancement layer packetizations may be optimized for the communication path between the encoder 306 and the decoder 314. For example, the data sequence 702 (FIG. 7) breakpoints may be selected to minimize expected distortion of the source reproduction 328 subject to bandwidth constraints of the communication path between the encoder 306 and the decoder 314. The base layer packetization may be allocated the subsequences delimited by the selected breakpoints and the enhancement layer packetization may contain additional forward error correction codes for the subsequences allocated to the base layer packetization. FIG. 9 illustrates this alternative scenario.

As for FIG. 8, a base layer packetization 902 is associated with the base layer of multiple description coding and an enhancement layer packetization 904 is associated with the enhancement layer of multiple description coding. A source data area 906 of the base layer packetization 902 may contain encoded subsequences of the distortion-prioritized data sequence delimited by the selected breakpoints. A forward error correction code area 908 of the base layer packetization 902 may contain forward error correction codes protecting the subsequences encoded in the source data area 906. The enhancement layer packetization 904 may contain addition forward error correction codes protecting the subsequences encoded in the source data area 906.

Figure 10:
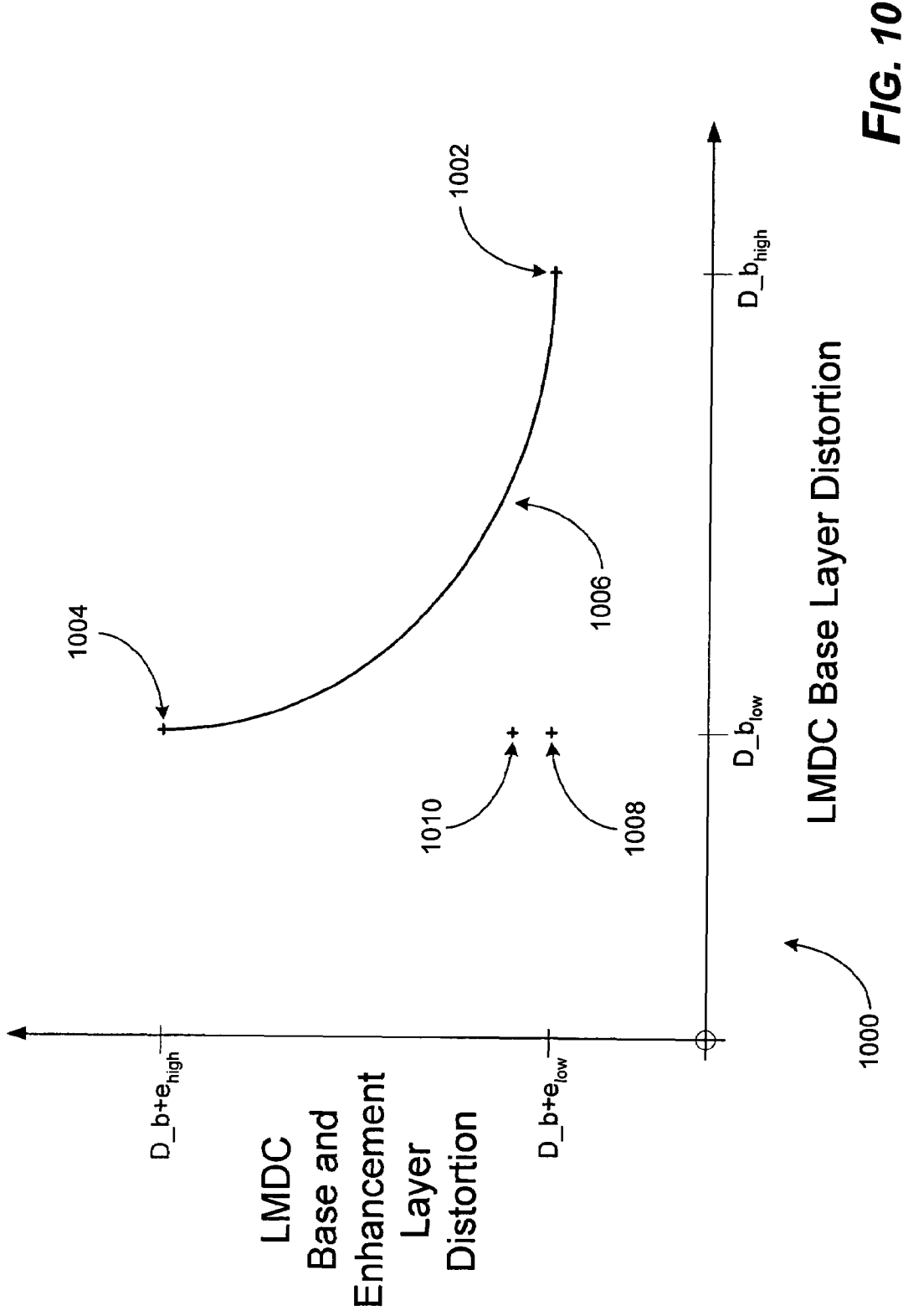
FIG. 10 is a graph comparing multi-layer multiple description coding packetization optimizations.

Although this alternate optimizing for the communication path between the encoder 306 (FIG. 3) and the decoder 314 may minimize distortion at the source reproduction 328, distortion at the source reproduction 330 may be high with respect to the distortion that may be achieved by optimizing for the communication path between the encoder 306 and the decoder 316. FIG. 10 shows a graph 1000 that may be utilized to compare multi-layer multiple description coding packetization optimizations. At point 1002 on the graph 1000, base and enhancement layer packetizations are optimized such that the source reproduction distortion may be relatively low when decoding both base and enhancement layers of multiple description coding ($D\_b+e_{low}$) and such that the source reproduction distortion may be relatively high when decoding only the base layer of multiple description coding ($D\_b_{high}$). That is, point 1002 corresponds to the optimization described above with reference to FIG. 8.

At point 1004 on the graph 1000, base and enhancement layer packetizations are optimized such that the source reproduction distortion may be relatively low when decoding only the base layer of multiple description coding ($D\_b_{low}$) and such that the source reproduction distortion may be relatively high when decoding both base and enhancement layers of multiple description coding ($D\_b+e_{high}$). That is, point 1004 corresponds to the optimization described above with reference to FIG. 9. Combinations of these two alternatives may also be possible. That is, the packetizations 802 and 804 may be optimized for a combination (e.g., a linear combination) of communication path characteristics. Optimizations for combinations of communication path characteristics correspond to points along a curve 1006 between the point 1002 and the point 1004.

Ideally, base and enhancement layer packetizations would be optimized such that source reproduction distortion would be relatively low when decoding only the base layer of multiple description coding ($D\_b_{low}$) and such that source reproduction distortion would be relatively low when decoding both base and enhancement layers of multiple description coding ($D\_b+e_{low}$). A point 1008 on the graph 1000 corresponds to such an ideal optimization. At point 1010 on the graph 1000, base and enhancement layer packetizations are optimized such that the source reproduction distortion may be relatively low when decoding only the base layer of multiple description coding ($D\__{+blow}$) and such that, when decoding both base and enhancement layers of multiple description coding, the source reproduction distortion may be less than the relatively high level $D\_b+e_{high}$. The point 1010 corresponds to base and enhancement layer packetization optimizations described below.

The enhancement layer packetization, in addition to encoded subsequences of the next part 706 of the distortion-prioritized data sequence 702 and forward error correction codes for those subsequences, may also include additional forward error correction codes for subsequences of the initial part 704 of the distortion-prioritized data sequence 702 encoded in the base layer packetization. That is, the layered multiple description coding may provide unequal erasure protection for different parts 704, 706 of the distortion-prioritized data sequence 702 at a level of layers of multiple description coding. In an embodiment of the invention, subsequences encoded in the enhancement layer packetization may not be decodable unless subsequences encoded in the base layer packetization are first decoded. As a result, additional forward error correction codes for subsequence data encoded in the base layer packetization may reduce a probability of base layer packet loss preventing enhancement layer contribution to source reproduction distortion reduction.

Figure 11:
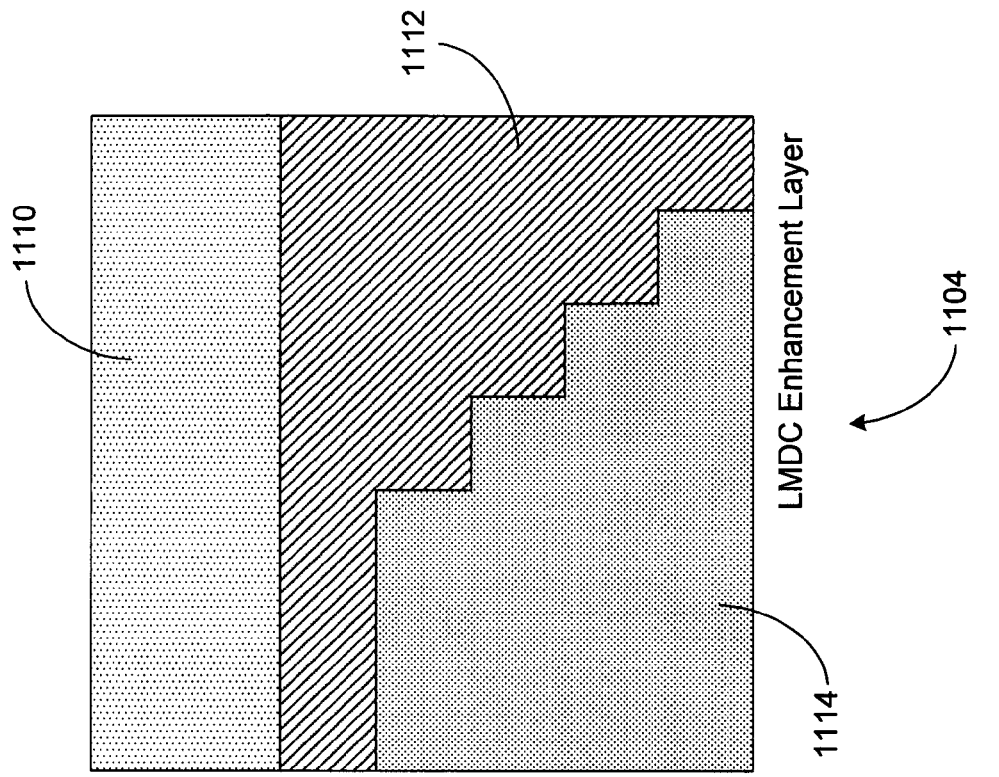
FIG. 11 is a data structure diagram illustrating example multiple description coding packetizations associated with base and enhancement layers of multiple description coding with unequal erasure protection of source data in accordance with an embodiment of the invention.
Figure 11:
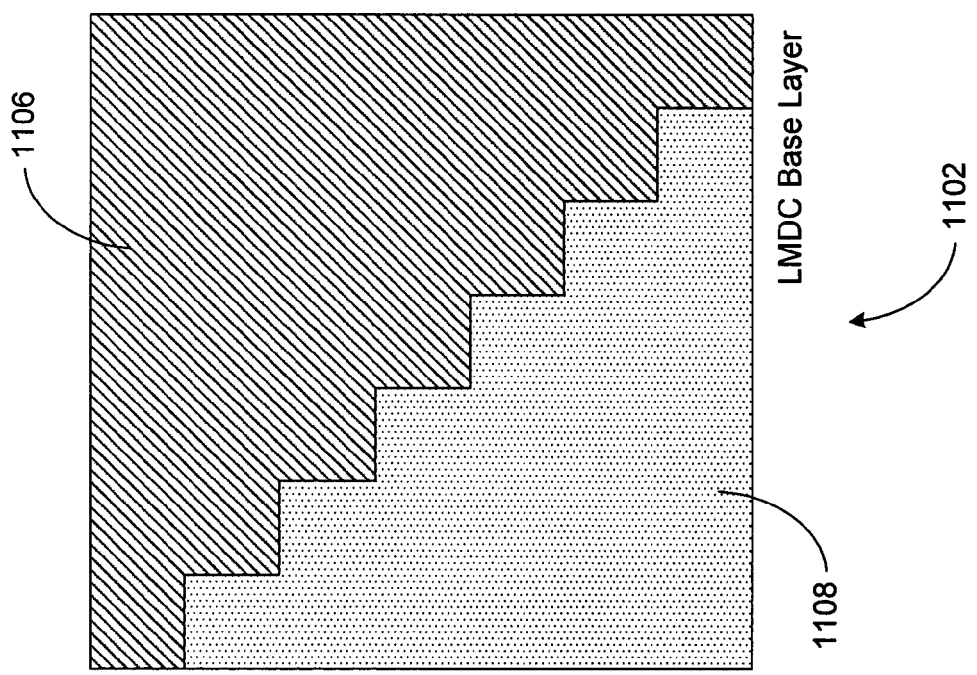

FIG. 11 schematically illustrates multiple description coding packetizations associated with base and enhancement layers of multiple description coding with unequal erasure protection of source data. As for FIG. 8, a base layer packetization 1102 is associated with the base layer of multiple description coding and an enhancement layer packetization 1104 is associated with the enhancement layer of multiple description coding. A source data area 1106 of the base layer packetization 1102 may contain encoded subsequences of the initial part 704 (FIG. 7) of the distortion-prioritized data sequence 702. A forward error correction code area 1108 of the base layer packetization 1102 may contain forward error correction codes protecting the subsequences encoded in the source data area 1106.

The enhancement layer packetization 1104 may include a first (or base layer) forward error correction code area 1110, a source data area 1112 and a second (or enhancement layer) forward error correction code area 1114. The source data area 1112 of the enhancement layer packetization 1104 may contain encoded subsequences of the next part 706 (FIG. 7) of the distortion-prioritized data sequence 702. The second forward error correction code area 1114 of the enhancement layer packetization 1104 may contain forward error correction codes protecting the subsequences encoded in the source data area 1112 of the enhancement layer packetization 1104. The first forward error correction code area 1110 may contain forward error correction codes protecting the subsequences encoded in the source data area 1106 of the base layer packetization 1102.

The packetizations 1102 and 1104 may be optimized by minimizing an expected source reproduction distortion measure D(R) that takes into account a data loss reduction characteristic of the additional forward error correction codes in the first forward correction code area 1110 of the enhancement layer packetization 1104. For example:

$$D(\mathbb{R}) = \sum_{n=0}^{k-1} p_{b,n} D(R_{b,n}) + \left(\sum_{n=k}^{N_b+q} p_{b,n}\right)\left(\sum_{n=0}^{N_e-q} p_{e,n} D(R_{e,n})\right)$$

where $N_b$ is a number of data packets in the base layer packetization 1102, $N_e$ is a number of data packets in the enhancement layer packetization 1104, q is a number of data packets in the first forward error correction code area 1110 of the enhancement layer packetization 1104, k is a minimum number of data packets of the base layer packetization 1102 needed to decode each subsequence encoded in the source data area 1106, $p_{b,n}$ is a probability of receiving n of the first $N_b+q$ data packets of the base and enhancement layer packetizations 1102 and 1104, $p_{e,n}$ is a probability of receiving n of the remaining $N_e-q$ data packets of the base and enhancement layer packetizations 1102 and 1104, $R_{b,n}$ is the 'n'th breakpoint of the initial part 704 (FIG. 7) of the data sequence 702, $R_{e,n}$ is the 'n'th breakpoint of the next part 706 of the data sequence 702, $D(R_{b,n})$ and $D(R_{e,n})$ are the expected source reproduction distortions associated with the specified breakpoints, and R is a vector of the data sequence 702 breakpoints $(R_{b,0}, R_{b,1}, \ldots, R_{b,Nb}, R_{e,0}, R_{e,1}, \ldots, R_{e,Ne})$ that may be selected so as to minimize D(R).

Figure 12:
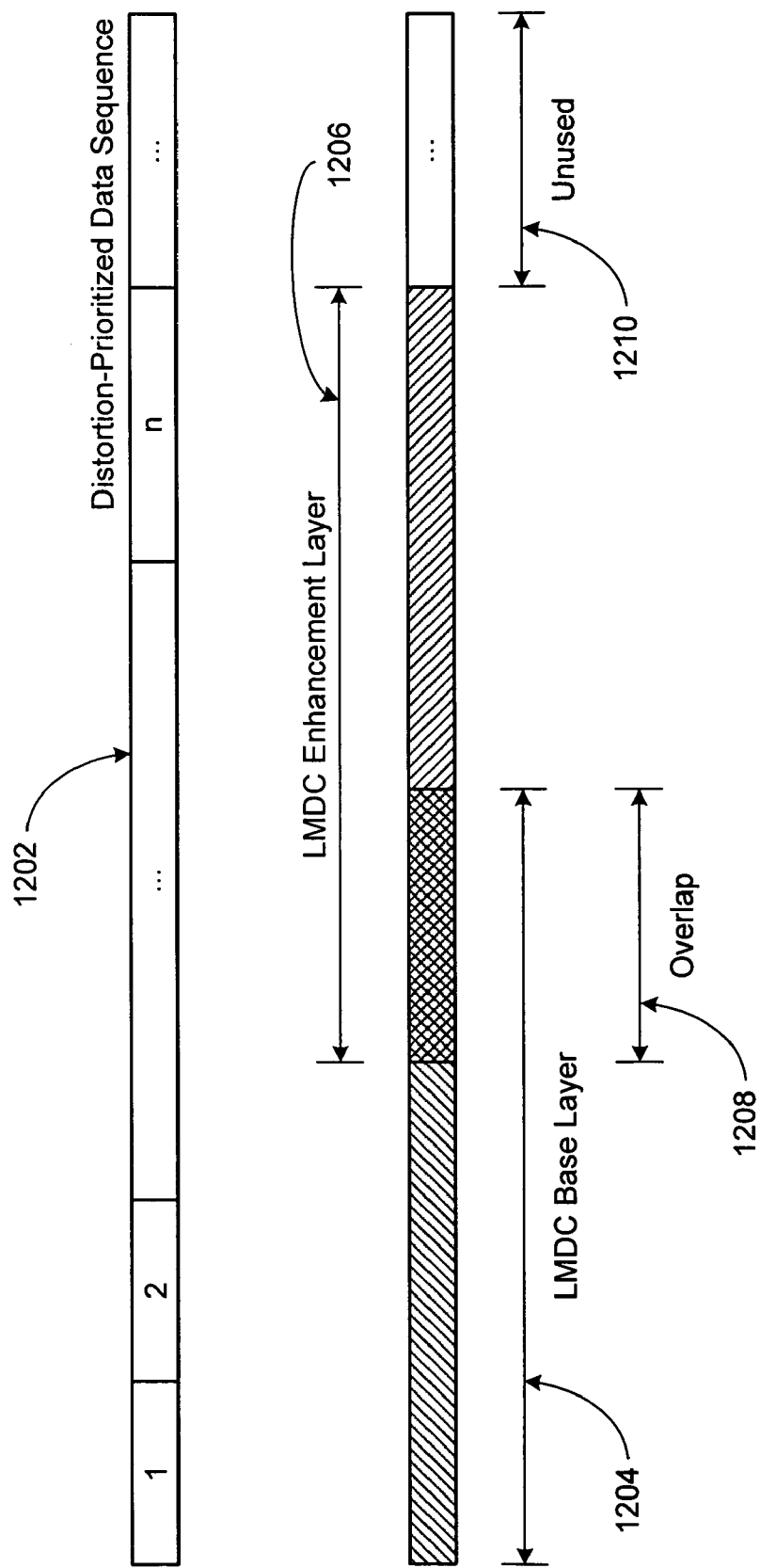
FIG. 12 is a data structure diagram illustrating another example way of allocating a distortion-prioritized data sequence to multiple layers of multiple description coding in accordance with an embodiment of the invention.

In an embodiment of the invention, another way to reduce the probability of base layer packet loss preventing enhancement layer contribution to source reproduction distortion reduction is to encode, in the enhancement layer packetization, a copy of a portion of the distortion-prioritized data sequence encoded in the base layer packetization, for example, a portion of the distortion-prioritized data sequence that is least protected by forward error correction code in the base layer packetization. That is, the initial and next parts of the distortion-prioritized data sequence encoded the base and enhancement layer packetizations of the layered multiple description coding may overlap. FIG. 12 illustrates another way (in contrast to the first way described with reference to FIG. 7) of allocating a distortion-prioritized data sequence 1202 to multiple layers of multiple description coding in accordance with an embodiment of the invention.

As for FIG. 7, the distortion-prioritized data sequence 1202 may correspond to the distortion-prioritized data sequence of FIG. 5. An initial part 1204 of the distortion-prioritized data sequence 1202 may be allocated to the base layer of multiple description coding. A next overlapping part 1206 of the distortion-prioritized data sequence 1202 may be allocated to the enhancement layer of multiple description coding. The allocation overlap 1208 is indicated in FIG. 12 (and corresponding areas of FIG. 13 below) by crosshatching. The allocation overlap 1208 may be a terminating portion of the initial part 1204 and an initial portion of the next overlapping part 1206 of the distortion-prioritized data sequence 1202. A remaining part 1210 of the distortion-prioritized data sequence 1202 may not be allocated to one of the layers of the layered multiple description coding.

The initial part 1204 and the next overlapping part 1206 may each include one or more subsequences of the distortion-prioritized data sequence 1202. Each boundary (e.g., beginning and end) of each part 1204 and 1206 may correspond to a subsequence boundary. For clarity, FIG. 12 shows allocation to only two overlapping layers of multiple description coding, however, the distortion-prioritized data sequence 1202 may be allocated to a plurality of overlapping base layers and/or enhancement layers of multiple description coding.

Figure 13:
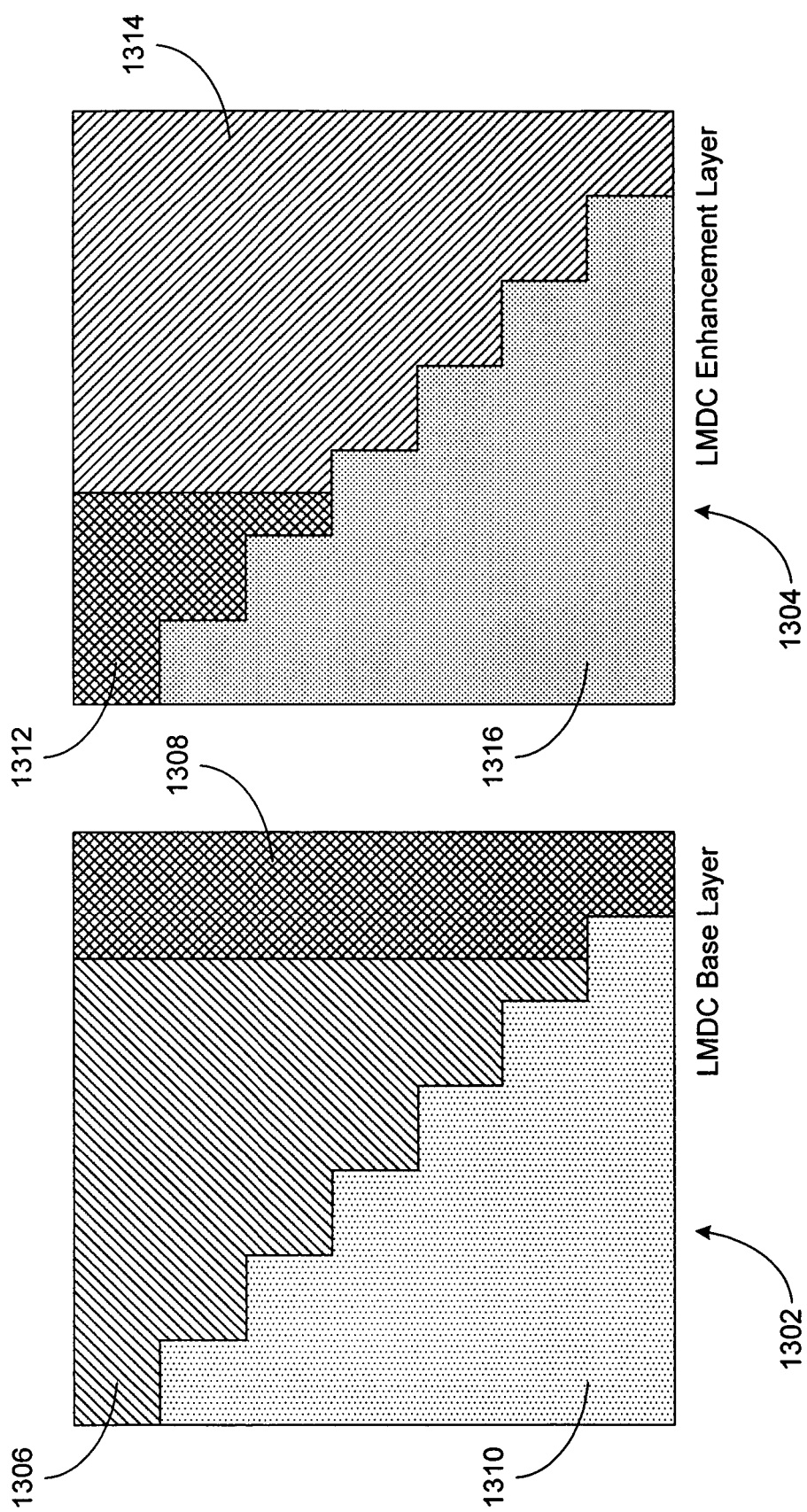
FIG. 13 is a data structure diagram illustrating example multiple description coding packetizations associated with overlapping base and enhancement layers of multiple description coding in accordance with an embodiment of the invention.

FIG. 13 schematically illustrates multiple description coding packetizations associated with overlapping base and enhancement layers of multiple description coding. As for FIG. 8, a base layer packetization 1302 is associated with the base layer of multiple description coding and an enhancement layer packetization 1304 is associated with the enhancement layer of multiple description coding. Subsequences of the initial part 1204 (FIG. 12) of the distortion-prioritized data sequence 1202 may be encoded in a first (or non-overlapping) source data area 1306 and a second (or overlapping) source data area 1308 of the base layer packetization 1302. A forward error correction code area 1310 of the base layer packetization 1302 may contain forward error correction codes protecting the subsequences encoded in the source data areas 1306 and 1308.

The enhancement layer packetization 1304 may include a first (or overlapping) source data area 1312 and a second (or non-overlapping) source data area 1314. The source data areas 1312 and 1314 of the enhancement layer packetization 1304 may contain encoded subsequences of the next overlapping part 1206 (FIG. 12) of the distortion-prioritized data sequence 1202. In particular, the overlapping source data area 1312 of the enhancement layer packetization 1304 may encode the same data subsequences as the overlapping source data area 1308 of the base layer packetization 1302. A forward error correction code area 1316 of the enhancement layer packetization 1304 may contain forward error correction codes protecting the subsequences encoded in the source data areas 1312 and 1314.

The packetizations 1302 and 1304 may be optimized by minimizing an expected source reproduction distortion measure $D(R_e)$ that takes into account a data loss reduction characteristic of encoding a copy of the overlapping (e.g., terminating) portion 1208 (FIG. 12) of the initial part 1204 of the distortion-prioritized data sequence 1202 in the first source data area 1312 of the enhancement layer packetization 1304. For example:

$$D(\mathbb{R}_e) = \sum_{m=0}^{N_b} p_{b,m} \sum_{n=0}^{N_e} p_{e,n} d_m(R_{e,n})$$

where:

$d_m(R_{e,n}) = D(R_m)$ if m<k, and $d_m(R_{e,n}) = \min\{D(R_m), D(R_{e,n})\}$ otherwise, and where $N_b$ is a number of data packets in the base layer packetization 1302, $N_e$ is a number of data packets in the enhancement layer packetization 1304, k is a minimum number of data packets of the base layer packetization 1302 needed to decode each subsequence encoded in the source data area 1306, $p_{b,m}$ is a probability of receiving m of the $N_b$ data packets of the base layer packetization 1302, $p_{e,n}$ is a probability of receiving n of the $N_e$ data packets of the enhancement layer packetization 1304, $R_{e,n}$ is the 'n'th breakpoint of the next overlapping part 1206 (FIG. 12) of the data sequence 1202, $D(R_m)$ and $D(R_{e,n})$ are the expected source reproduction distortions associated with the specified breakpoints ($D(R_m)$ may be a constant in $R_e$), and $R_e$ is a vector of the next overlapping part 1206 data sequence 1202 breakpoints ($R_{e,0}, R_{e,1}, \ldots, R_{e,Ne}$) that may be selected so as to minimize $D(R_e)$. An embodiment of the invention may also incorporate combinations of the packetization and packetization optimization techniques described above with reference to FIG. 11, FIG. 12 and FIG. 13.

Figure 14:
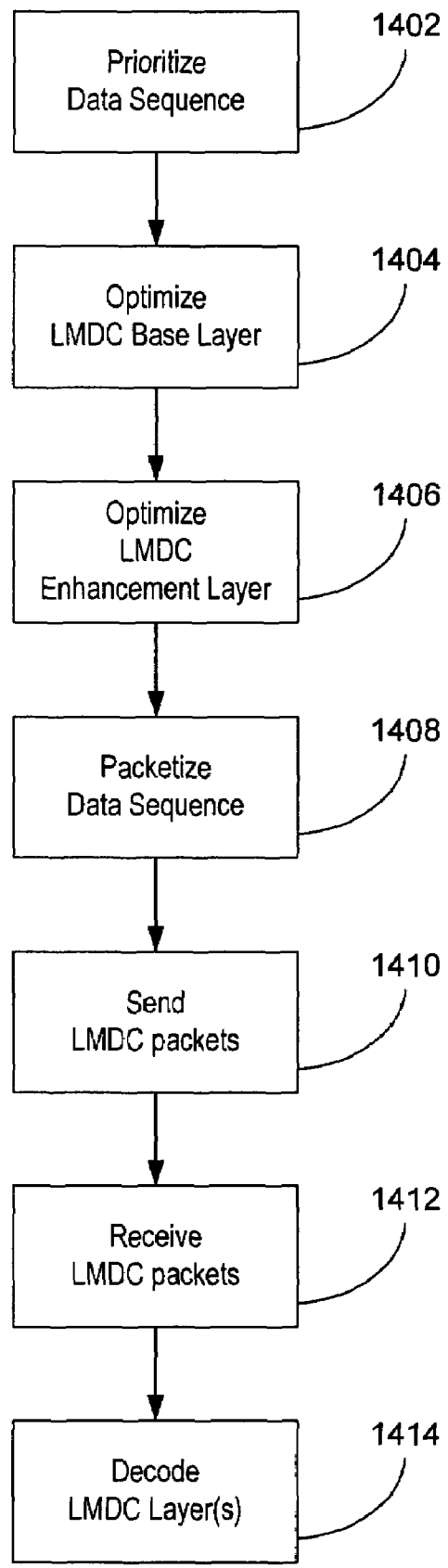
FIG. 14 is a flowchart depicting example steps incorporating encoding and decoding of layered multiple description coding in accordance with an embodiment of the invention.

Base and enhancement layer packetizations such as those described above may be encoded by the layered multiple description encoder 306 (FIG. 3) and decoded by the layered multiple description decoders 314 and 316. FIG. 14 depicts example steps incorporating encoding and decoding of layered multiple description coding in accordance with an embodiment of the invention. At step 1402, subsequences of source data 420 (FIG. 4) may be prioritized according to their source reproduction distortion reduction potential in order to generate the distortion-prioritized data sequence 422.

At step 1404, the base layer of multiple description coding may be optimized with respect to communication paths to one or more sets of candidate decoders. For example, the base set of data sequence breakpoints 430 (FIG. 4) may be determined for the base layer of multiple description coding 434. At step 1406, the enhancement layer of multiple description coding may be optimized with respect to communication paths to one or more sets of candidate decoders. For example, the enhancement set of data sequence breakpoints 432 may be determined for the enhancement layer of multiple description coding 436.

At step 1408, the data sequence 422 (FIG. 4) may be encoded in a plurality of layers of multiple description coding. For example, the initial part of the data sequence 422 may be encoded in the base layer packetization of the base layer of multiple description coding 434 in accordance with the base set of data sequence breakpoints 430 and the next part of the data sequence 422 may be encoded in the enhancement layer packetization of the enhancement layer of multiple description coding 436 in accordance with the enhancement set of data sequence breakpoints 432. At step 1410, the data packets of the packetizations associated with the plurality of layers of multiple description coding are sent to candidate decoders. For example, data packets of the base layer packetization may be sent to the layered multiple description decoder 314 (FIG. 3) and packets of the base and enhancement layer packetizations may be sent to the layered multiple description decoder 316.

At step 1412, the data packets of one or more packetizations associated with the layered multiple description coding are received at layered multiple description decoders. Some of the data packets of the one or more packetizations may be lost in transit. For example, the layered multiple description decoder 314 may receive each of the data packets of the base layer packetization except one, and the layered multiple description decoder 316 may receive each of the data packets of the base and enhancement layer packetizations except for one data packet lost from the base layer packetization.

At step 1414, at least a portion of the distortion-prioritized data sequence 422 may be decoded from at least one of the plurality of layers of multiple description coding. For example, the layered multiple description decoder 314 may decode the initial part of the distortion-prioritized data sequence with a single error despite the loss of one of the data packets of the base layer packetization because of the forward error correction codes encoded in the base layer packetization that protect the initial part of the data sequence. The layered multiple description decoder 316 may decode the initial part of the distortion-prioritized data sequence without error despite the loss of one of the data packets of the base layer packetization because of additional forward error correction codes or repeated subsequences encoded in the enhancement layer packetization. The layered multiple description decoder 316 may further decode the next part of the distortion-prioritized data sequence from the enhancement layer packetization.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-readable medium having thereon computer-executable instructions for performing a method comprising decoding at least a portion of a distortion-prioritized data sequence from at least one of a plurality of layers of multiple description coding, the plurality of layers of multiple description coding comprising:
   a first layer of multiple description coding, the first layer of multiple description coding comprising:
   an initial part of the distortion-prioritized data sequence; and forward error correction code for the initial part of the distortion-prioritized data sequence; and
   a second layer of multiple description coding, the second layer of multiple description coding comprising:
   a next part of the distortion-prioritized data sequence; and
   forward error correction code for the next part of the distortion-prioritized data sequence;
   wherein the second layer of multiple description coding further comprises forward error correction code for the initial part of the distortion-prioritized data sequence.

2. The computer-readable medium of claim 1, wherein the second layer of multiple description coding further comprises a terminating portion of the initial part of the distortion-prioritized data sequence.

3. A computer-readable medium having thereon a data structure comprising a distortion-prioritized data sequence encoded in a plurality of layers of multiple description coding, the plurality of layers of multiple description coding comprising:
   a first layer of multiple description coding, the first layer of multiple description coding comprising:
   an initial part of the distortion-prioritized data sequence; and
   forward error correction code for the initial part of the distortion-prioritized data sequence; and
   a second layer of multiple description coding, the second layer of multiple description coding comprising:
   a next part of the distortion-prioritized data sequence; and
   forward error correction code for the next part of the distortion-prioritized data sequence;
   wherein the second layer of multiple description coding further comprises forward error correction code for the initial part of the distortion-prioritized data sequence.

4. The computer-readable medium of claim 3, wherein the second layer of multiple description coding further comprises a terminating portion of the initial part of the distortion-prioritized data sequence.

5. The computer-readable medium of claim 3, wherein:
   each layer of multiple description coding comprises a plurality of packetized descriptions; and
   each layer of multiple description coding is associated with at least one set of communication paths.

6. The computer-readable medium of claim 5, wherein the plurality of packetized descriptions for each layer of multiple description coding are formatted in accordance with a priority encoding tranmsission packetization.

7. The computer-readable medium of claim 3, wherein:
   each layer of multiple description coding is associated with at least one set of communication paths;
   each set of communication paths is associated with at least one communication path characteristic; and
   packetizations of the first and second layers of multiple description coding are a function of, at least, said at least one communication path characteristic of each of said at least one set of communication paths associated with each of the first and second layers of multiple description coding.

8. The computer-readable medium of claim 3, wherein:
   each layer of multiple description coding is associated with at least one set of communication paths;
   each set of communication paths is associated with a data loss characteristic;
   a packetization of the first layer of multiple description coding is a function of, at least, the data loss characteristic of a first set of communication paths; and
   a packetization of the second layer of multiple description coding is a function of, at least, the data loss characteristic of a second set of communication paths.

9. The computer-readable medium of claim 8, wherein:
   the second layer of multiple description coding further comprises additional forward error correction code for the initial part of the distortion-prioritized data sequence; and
   the packetization of the second layer of multiple description coding takes into account a data loss reduction characteristic of the additional forward error correction code for the initial part of the distortion-prioritized data sequence.

10. The computer-readable medium of claim 8, wherein:
    the second layer of multiple description coding further comprises a copy of a terminating portion of the initial part of the distortion-prioritized data sequence; and
    the packetization of the second layer of multiple description coding takes into account a data loss reduction characteristic of the copy of the terminating portion of the initial part of the distortion-prioritized data sequence.

11. The computer-readable medium of claim 3, wherein:
    the distortion-prioritized data sequence comprises a sequence of data subsequences;
    each data subsequence is capable of reducing distortion by a different amount;
    data subsequences capable of reducing distortion by greater amounts are ordered so that they are earlier in the distortion-prioritized data sequence;
    the initial part of the distortion-prioritized data sequence comprises an initial part of the sequence of data subsequences; and
    the next part of the distortion-prioritized data sequence comprises a next part of the sequence of data subsequences.

* * * * *